US006246658B1

United States Patent
White et al.

(10) Patent No.: US 6,246,658 B1
(45) Date of Patent: Jun. 12, 2001

(54) MULTIPLE CHANNEL SCANNING DEVICE USING OPTOELECTRONIC SWITCHING

(75) Inventors: Robert Courtney White, Fairfax; Newell Convers Wyeth, Oakton; Adam Thomas Drobot, Annandale, all of VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/088,782

(22) Filed: Jun. 2, 1998

(51) Int. Cl.$^7$ .................................................. G11B 7/00

(52) U.S. Cl. ...................................... 369/112.27; 369/121

(58) Field of Search .............................. 369/44.37, 44.28, 369/32, 112, 121

(56) References Cited

U.S. PATENT DOCUMENTS

| | | |
|---|---|---|
| 3,112,360 | 11/1963 | Gregg . |
| 3,892,468 | 7/1975 | Dunguay . |
| 4,058,736 | 11/1977 | Takahashi et al. . |
| 4,135,083 | 1/1979 | Van Alem et al. . |

(List continued on next page.)

OTHER PUBLICATIONS

Scanning Device Using Fiber Optic Bimorph (Adam Thomas Drobot, Robert Courtney White). Our reference: 00479.02150, U.S. Application Serial No. 09/089,138, filed Jun. 2, 1998.

Multiple Parallel Source Scanning Device (Adam Thomas Drobot, Robert Courtney White, Newel Convers Wyeth). Our Reference: 00479.02151, U.S. Application Serial No. 09/089,137, filed Jun. 2, 1998.

Multiple Channel Data Writing Device (Adam Thomas Drobot, Robert Courtney White, Newel Convers Wyeth, Albert Myron Green). Our Reference: 00479.02152, U.S. Application Serial No. 09/089,136, filed Jun. 2, 1998.

(List continued on next page.)

*Primary Examiner*—Nabil Hindi
(74) *Attorney, Agent, or Firm*—Banner & Witcoff, Ltd.

(57) ABSTRACT

An optical scanner employs a read/write head formed on an optoelectronic chip. The chip has a laser source and a diverging series of light guides interconnected with switches under control of a controller. The light from the light source is transmitted to multiple output apertures during reading operations, since, usually, less intensity is required to read data that to write it. This allows multiple channels to be read in at the same time. The light is directed to a selected output aperture during writing operations so that all of the light from the laser source is used for writing. In another embodiment, light from a small number of lasers is directed to a diverging series of light guides leading to multiple apertures, but the light fed into the input light guides comes from a small number of lasers, which could be one laser, or from a larger number of lasers, which could be two lasers. In this way, multiple channels can be written and read using the larger number of lasers during the write operation and the small number of lasers during the read operation. In either embodiment, the write operation involves modulating the emitted light, either by modulating the lasers directly or by using the switches on the optoelectronic chip. For scanning, the chip is oscillated by a motor, which could be a MEMS motor. Light emitted by the output apertures illuminates an array of small spots, in this embodiment, by imaging optics fixed relative to the scanned surface. This generates a rapidly sweeping array of light spots on the scanned surface. In alternative embodiments, the focusing optics are oscillated and the fiber array is held fixed, or the focusing optics and the fiber array are oscillated as a single assembly.

40 Claims, 5 Drawing Sheets

U.S. PATENT DOCUMENTS

| | | |
|---|---|---|
| 4,234,488 | 11/1980 | Palmer et al. . |
| 4,283,777 * | 8/1981 | Curry et al. .................... 369/32 |
| 4,337,531 | 6/1982 | Willemsen . |
| 4,482,986 | 11/1984 | Noda et al. . |
| 4,507,765 | 3/1985 | Suzuki et al. . |
| 4,564,268 | 1/1986 | Tatsuno et al. . |
| 4,572,949 | 2/1986 | Bowers et al. . |
| 4,737,946 | 4/1988 | Yamashita et al. . |
| 4,744,073 | 5/1988 | Sugiki . |
| 4,755,668 | 7/1988 | Davis . |
| 4,763,973 | 8/1988 | Inou et al. . |
| 4,767,210 | 8/1988 | Kashyap . |
| 4,771,415 | 9/1988 | Taki . |
| 4,815,807 | 3/1989 | Kaneko et al. . |
| 4,858,215 | 8/1989 | Yano et al. . |
| 4,991,160 | 2/1991 | Premji . |
| 5,001,338 | 3/1991 | Boero . |
| 5,010,346 | 4/1991 | Hamilton et al. . |
| 5,070,488 | 12/1991 | Fukushima et al. . |
| 5,095,472 * | 3/1992 | Uchino et al. ............... 369/44.37 |
| 5,109,459 | 4/1992 | Eibert et al. . |
| 5,121,449 | 6/1992 | Shiba et al. . |
| 5,128,915 | 7/1992 | Yamashita et al. . |
| 5,144,604 | 9/1992 | Sugiura . |
| 5,144,616 | 9/1992 | Yasukawa et al. . |
| 5,195,152 | 3/1993 | Gupta . |
| 5,278,812 * | 1/1994 | Adar et al. ................ 369/44.37 |
| 5,289,454 | 2/1994 | Mohapatra et al. . |
| 5,293,291 | 3/1994 | Ohki et al. . |
| 5,317,148 | 5/1994 | Gray et al. . |
| 5,390,157 | 2/1995 | Revelli, Jr. . |
| 5,416,881 | 5/1995 | Ikeda . |
| 5,422,469 | 6/1995 | Bard et al. . |
| 5,444,689 | 8/1995 | Ohki et al. . |
| 5,452,382 | 9/1995 | Shionoya et al. . |
| 5,465,243 * | 11/1995 | Boardman et al. ............ 369/44.37 |
| 5,661,591 | 8/1997 | Lin et al. . |

OTHER PUBLICATIONS

Method and Apparatus for Controlling the Focus of a Read/Write Head for an Optical Scanner (Edward Alan Phillips, Newel Convers Wyeth). Our Reference: 00479.02154, U.S. Application Serial No. 09/088,781, filed Jun. 2, 1998.

Multiple Channel Scanning Device using Oversampling and Image Processing to Increase Throughput (Adam Thomas Drobot, Robert Courtney White, Newel Convers Wyeth, Albert Myron Green, Edward Alan Phillips). Our Reference: 00479.02155, U.S. Application Serial No. 09/088,780, filed Jun. 2, 1998.

Abstract of Yuji Uenishi, Hidenao Tanaka, and Hiro Ukita, "AlGaAs/GaAs micromachining for monolithic integration of optical and mechanical components", (Proc. SPIE vol. 2291, pp. 82–91, Integrated Optics and Microstructures II, Massood Tabib–Azar; Dennis L. Polla; Ka–Kha Wong; Eds. Oct. 1994).

* cited by examiner

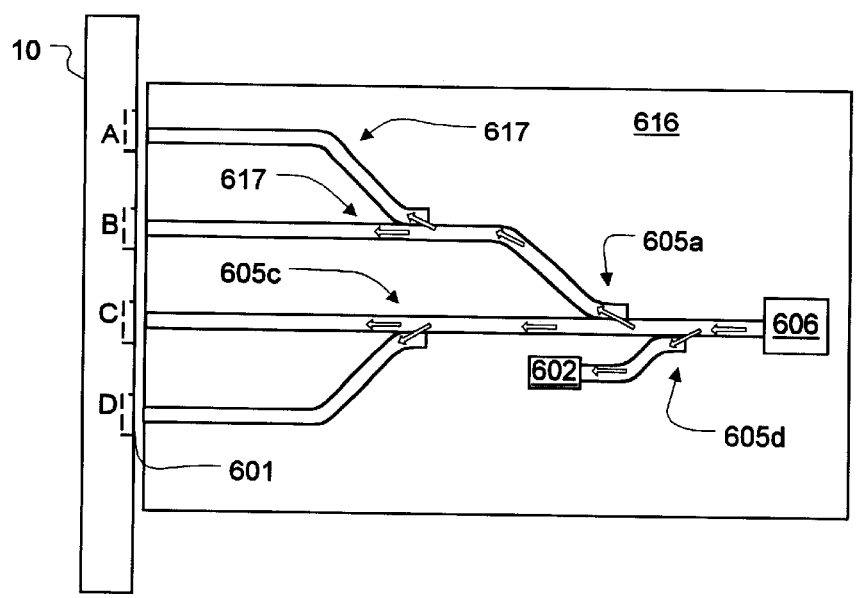
Fig. 2
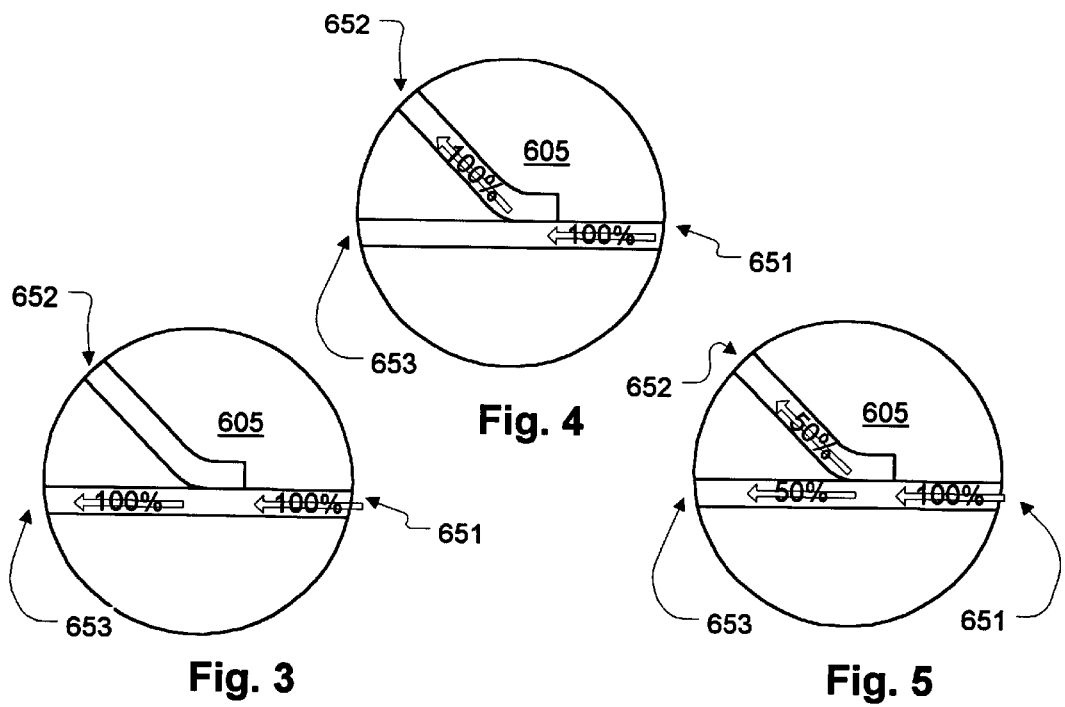
Fig. 3  Fig. 4  Fig. 5

MULTIPLE CHANNEL SCANNING DEVICE USING OPTOELECTRONIC SWITCHING

BACKGROUND OF THE INVENTION

Various optical scanners are known for such applications as data storage, bar code reading, image scanning (surface definition, surface characterization, robotic vision), and lidar (light detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector (not shown). To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, or a lens driven galvanometrically or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally attended by high costs for mass manufacture, assembly, and alignment.

TABLE 1

Performance of Conventional Beam Deflectors for Optical Scanning.

| Parameter | Polygonal Mirrors | Galvano-Driven Mirrors | Hologons (Transmission) | Acousto-Optic Deflectors |
|---|---|---|---|---|
| Wavefront Distortion | $\lambda/8$ at 0.55 $\mu$m | $\lambda/8$ at 0.55 $\mu$m | $\lambda/6$ at 0.55 $\mu$m | $\lambda/2$ at 0.55 $\mu$m |
| Area resolution (spot-widths/sec) | 25,000 (scan lens limited) | 25,000 (scan lens limited) | 25,000 (scan lens limited) | 1,000 (scan lens limited) |
| Cross-axis error | 10 arc sec (uncorrected) | 1–2 arc sec (uncorrected) | 10 arc sec | 0 |
| Speed (spot widths/sec) | $1 \times 10^8$ | $2 \times 10^6$ | $2 \times 10^7$ | $2.8 \times 10^7$ |
| Bandwidth | 0.3–20 $\mu$m | 0.3–20 $\mu$m | Monochromatic | monochromatic |
| Scan efficiency | 80–100% | 65–90% | 90% | 60–80% |

(from The Photonics Design and Applications Handbook 1993, Laurin Publishing Co., Inc., p. H-449)

The performance parameters listed in Table 1 assume different levels of importance depending on the optical scanning application. For raster scanning to cover extended surface areas, the emphasis is on speed, area resolution, and scan efficiency. Wide bandwidth is needed if the surface is to be color-scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (cells) in which some optical property has been set at one of two or more values to represent digital information. Commercial read/write heads scan the media with a diffraction-limited spot, typically produced by focusing a collimated laser beam with a fast objective lens system as shown in FIG. 1. A fast objective lens, one with a high numerical aperture, achieves a small spot size by reducing Fraunhofer-type diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit cells must be followed by the spot with sufficient precision to avoid missing any bit cells. The fine tracking is achieved by servo mechanisms moving the objective lens relative to the head assembly. An auto-focus servo system is also necessary to maintain the diffraction limited spot size because the medium motion inevitably causes some change in the mean/medium separation with time. Proper focus adjustment is possible because the medium is flat and smooth. Such a surface reflects incident light in well-defined directions like a mirror. Light reflected from the medium is collected by focusing optics and sent back along the collimated beam path for detection.

Scanning by several spots simultaneously is used to achieve high data rates through parallelism in one known system called the CREO® optical tape system. One scanning device that avoids reliance on discrete optical elements to achieve scanning is described in U.S. Pat. No. 4,234,788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber as the fiber is forced back and forth repeatedly. To make the fiber wiggle back and forth an alternating electric field, generally perpendicular to the axis of the fiber, is generated. The fiber is coated with a metallic film. A charge is stored on the film, especially near the tip, by forming a capacitance with a metallized plate oriented perpendicularly to the fiber axis (optically at least partly transparent). The stored charge makes the fiber responsive to the electric field.

A drawback of this device is the limit on the speeds with which the fiber can be made to oscillate. The device requires a series of elements to move the fiber: an external field-generating structure, a DC voltage source to place charge on the fiber coating, and an AC source to generate the external field. Another drawback of this prior art mechanism is the inherent problem of stress fractures in the fiber optics. Bending the fiber repeatedly places serious demands on the materials. Problems can arise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very close to the scanned surface as may be desired for certain optical configurations.

Another prior art scanning device is described in U.S. Pat. No. 5,422,469. This patent specification describes a number of different devices to oscillate the end of an optical light guide or optical fiber. One embodiment employs a piezoelectric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezoelectric bimorph. However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

An optical scanner employs a read/write head formed on an optoelectronic chip. The chip has a laser source and a diverging series of light guides interconnected with switches under control of a controller. The light from the light source is transmitted to multiple output apertures during reading operations, since, usually, less intensity is required to read data that to write it. This allows multiple channels to be read in at the same time. The light is directed to a selected output aperture during writing operations so that all of the light from the laser source is used for writing. In another embodiment, light from a small number of lasers is directed to a diverging series of light guides leading to multiple apertures, but the light fed into the input light guides comes from a small number of lasers, which could be one laser, or from a larger number of lasers, which could be two lasers. In this way, multiple channels can be written and read using the larger number of lasers during the write operation and the small number of lasers during the read operation. In either embodiment, the write operation involves modulating the emitted light, either by modulating the lasers directly or by using the switches on the optoelectronic chip. For scanning, the chip is oscillated by a motor, which could be a MEMS motor. Light emitted by the output apertures illuminates an array of small spots, in this embodiment, by imaging optics fixed relative to the scanned surface. This generates a rapidly sweeping array of light spots on the scanned surface. In alternative embodiments, the focusing optics are oscillated and the fiber array is held fixed, or the focusing optics and the fiber array are oscillated as a single assembly.

According to an embodiment, the invention provides a multiple channel data reading/writing device that reads data from a medium and writes data to a medium. The device has a read/write head with a light-source and an array of output apertures from which light is emitted. The light outputs and the source are used to perform reading and writing operations on the medium. A series of light guides, electro-optical switches, and a controller are interconnected to guide, under control of the controller, light from the light source. The controller selectively guides the light to a first number of the output apertures at a first time coinciding with a writing operation. It guides the light from the light source to a second number of the output apertures at a second time coinciding with a reading operation. In a variant, the light source includes a light-dumping switch and a beam dump interconnected so that the light from the light source can be modulated by selectively dumping light into the beam dump or transmitting light into the series of light guides. In another variant, the first number of output apertures is fewer than the second number of output apertures. In another variant, the light source is a single laser embedded in an optoelectronic chip. In another variant, the light guides are formed photo lithographically in an optoelectronic chip. In still another variant, the light source is a plurality of lasers linked together by switchable crossovers connected to the controller and the controller is programmed to switch a first of the lasers to transmit light into the series of light guides when a second of the lasers fails. Another feature provides that the light source is made up of several lasers linked together by light guides and couplers that combine light from the lasers. According to another variant, the device has a frame connected to the read/write head. The medium is attachable to the frame such that the medium is movable relative to the read/write head. Thus, the medium moves in a first direction relative to the read/write head. An oscillating motor is connected between the frame and the read/write head to oscillate the read/write head relative to the medium. In another variation, the medium is moved continuously in the first direction at a constant speed. In another, a direction of oscillation of the read/write head has a component substantially perpendicular to the first direction. In still another embodiment, the controller is programmed to convey substantially all of the light from light source sequentially toward each of the multiple output apertures.

According to another embodiment, the invention provides a multiple channel data reading/writing device that reads data from a medium and writes data to a medium. The device has a read/write head containing a source of light and an array of output apertures from which light is emitted to perform reading and writing operations on the medium. The read/write head has a series of light guides, electro-optical switches, and a controller all interconnected to guide the light under control of the controller. The controller causes light from the light source to be selectively guided to a first number of the output apertures at a first time coinciding with a writing operation. It guides the light source to a second number of the output apertures at a second time coinciding with a reading operation. The device has a frame connected to the read/write head. The medium is attachable to the frame such that the piece of medium is movable relative to the read/write head. Thus, media moves in a first direction relative to the read/write head. An oscillating motor connected between the frame and the read/write head oscillates the read/write head relative to the medium. In a variation, the light source is a plurality of lasers linked together by switchable crossovers connected to the controller. The controller is programmed to switch one of the lasers in to transmit light into the series of light guides when any of the then-operating lasers fails. In another variant, the light source includes a light-dumping switch and a beam dump interconnected so that the light from the light source can be modulated by selectively dumping light into the beam dump or transmitting light into the series of light guides. In another variation, the light source is a number of lasers linked together by switchable crossovers connected to the controller. The controller is programmed to switch-in a backup laser when one of them fails. The lasers are further linked together by other light guides and couplers that direct light from at least two of the lasers into the series of light guides to combine their respective energies. In another variant, the first number output apertures is less than the second number of output apertures.

According to another embodiment, the invention provides a method of reading and writing data from a medium using a light source. The method includes these steps. (1) directing light from the light source to a first number of light spots on a recordable medium during a writing operation to the medium; and (2) directing light from the light source to a second number of light spots on the recordable medium during a reading operation of the medium; (3) the first number being lower than the second number. In a variant, step (1) includes directing light into a light guide leading to an output aperture and projecting light emitted from the output aperture onto the medium. In another variant, step (2) includes directing light into at least one light guide leading to multiple output apertures and projecting light emitted from the output aperture onto the medium. In still another variant, step (1) includes directing light into a light guide leading to an output aperture and projecting light emitted from the output aperture onto the medium; and step (2) includes directing light into at least one light guide leading to multiple output apertures and projecting light emitted from the output aperture onto the medium.

The invention provides an essential component in an optoelectronic chip designed to direct the flow of light and modulate the light output in a multi-channel optical scanning head. The invention leads to a reliable, robust, manufacturable, low-cost component for optical scanning devices used for optical data storage, bar code readers, image scanning for digitization or xerography, laser beam printers, inspection systems, densitometers, and 3-dimensional scanning (surface definition, surface characterization, robotic vision).

BRIEF DESCRIPTION OF THE DRAWING

In the drawing,

FIG. 2 is an illustration of an optoelectronic chip with integral waveguides, beam switches, a laser source, and beam dumps to allow the generation of a modulated signal using one laser source through multiple channels simultaneously.

FIGS. 3, 4, and 5 illustrate the light flow taken by an optoelectronic switch in three respective modes.

DETAILED DESCRIPTION OF THE EMBODIMENTS

Figure 1:
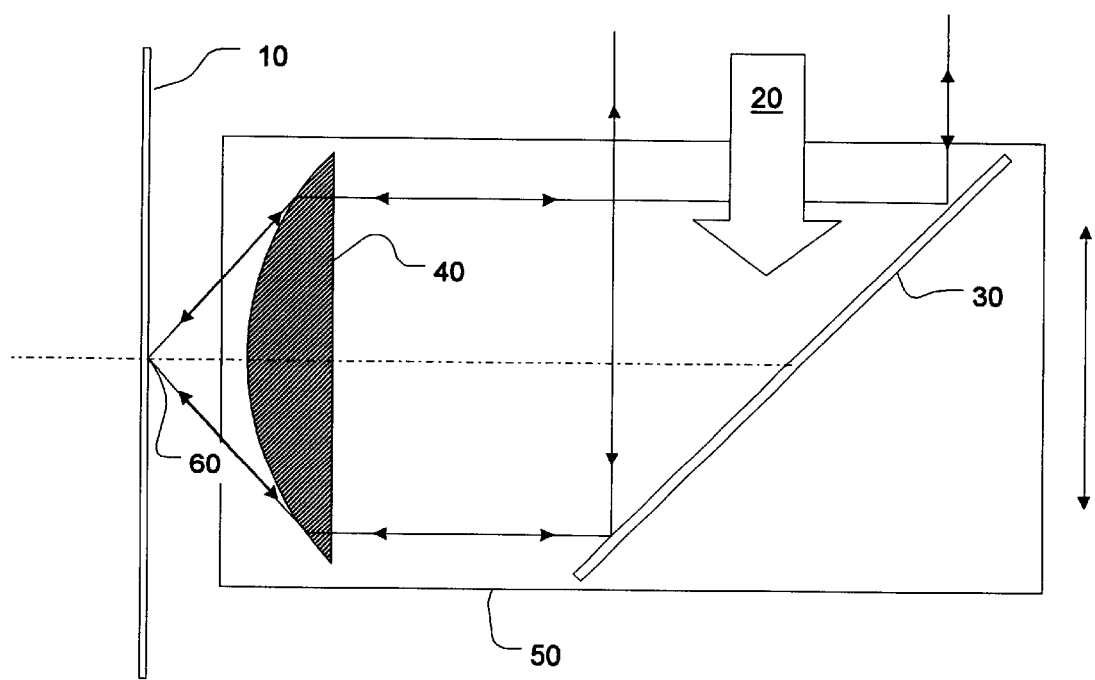
FIG. 1 is a ray trace diagram showing a scanning device according to the prior art.

Referring to FIG. 2, an optical scanning optoelectronic chip 616 has single laser source 606 that supplies light to multiple output apertures 601. Light emitted by laser 606 is guided by light guides 617 to various rail taps 605*a*–605*c*. Light from laser 606 is output, ultimately, through four output apertures 601 and applied to a scanned surface 10 at regions A, B, C, and D respectively. An optical switch 605*d* allows light from the laser to be directed to a beam dump 602 for absorption and dissipation of light energy. Switching optical switch 605*d* to a bypass position, in effect modulates the output of light from the output apertures 601. Note that although in the embodiment shown, light is directed at the scanned region without any focusing optics, focusing optics may be used between the chip 616 and the target 10. Also note that although the chip 616 has an on-board laser, the laser could be a separate device and light applied to the light guide network through an input aperture. Also note that the lens system could be made from a single holographic element (not shown).

The light guides 617 (or optical wave guides) are formed directly in the chip 616 using fabrication techniques similar to those employed in the manufacture of integrated circuits. Optoelectronic chips are formed in a layer-by-layer process beginning with a suitable substrate such as silicon or glass wafer. A thin metal film is applied to the substrate and patterned to define electrodes and conductors. Next, a layer of material is added to form the optical waveguides and the material is patterned using photolithography. Switches may be formed by doping the material to create non-linear optical effects in the switching regions. In a purely additive process, additional material layers can be applied sequentially, on each of which additional optical paths, electrodes, and conductors can be formed.

In the embodiment of FIG. 2, the chip 616 is configured to distribute the power input from one laser to four different output channels that will be used for scanning. The optical junctions, switches, or railtaps 605*a* through 605*c* are capable of selectively distributing the light power flow (minus internal losses of a few dB) among the various paths defined by light guides 617. Each optical rail tap 605*a*–605*c*, has at least three operating modes. Referring to FIG. 3, in the first, rail tap 605 permits all the light energy entering it at 651 to pass straight through to 653 (of course, there are losses). Referring to FIG. 4, in the second mode, all of the energy entering at 651 is bypassed to the branch at 652. Referring to FIG. 5, in the third mode, half the energy is bypassed to branch 652 and half permitted to pass straight through to branch 653. When all three of the rail taps 605a–605c are set to 50% bypass, the third mode, light passes through the output channels such that the energy arriving at the four output apertures is substantially equal. Referring now also to FIG. 2, if the three rail taps are operated sequentially as indicated in the following table, all of the laser output can be directed to the respective output apertures in succession.

| Target region | Rail tap positions | | |
|---|---|---|---|
| | 605a | 605b | 605c |
| A | Mode 2 | mode 2 | no effect |
| B | Mode 2 | mode 1 | no effect |
| C | Mode 1 | no effect | mode 1 |
| D | Mode 1 | no effect | mode 2 |

As the terms are used in the following discussion, "write" refers to making a durable change in a medium. The term "read" refers to the process of collecting information from a medium without permanently altering the medium. Assume that the maximum laser output is just enough (after system losses) to supply one channel with power for a writing scanning beam. A read/write head with the chip in FIG. 2 would use the switching functions of the optical railtaps to direct all of the laser power to each of the four output channels in succession for writing, with precise synchronization to address each channel at the time when its output was positioned to write. Modulation of the writing power channel is done using the first rail tap 605d. The chip will use that switch to divert the laser output to the beam dump when the output channel is writing a space and supply the full power when writing a mark. In this way, the laser can remain on at constant power with less stress and longer lifetime.

In many cases (e.g. reading and writing on phase-change optical storage media), much less light energy is used to read a pattern already written than to write the pattern. In that case, the chip 616 can divide the laser input power equally among the four output channels during the reading function, and four reading channels can be scanned simultaneously. For reading, each channel output is on all the time, and the scanned pattern on the surface modulates the return signal.

Figure 6:
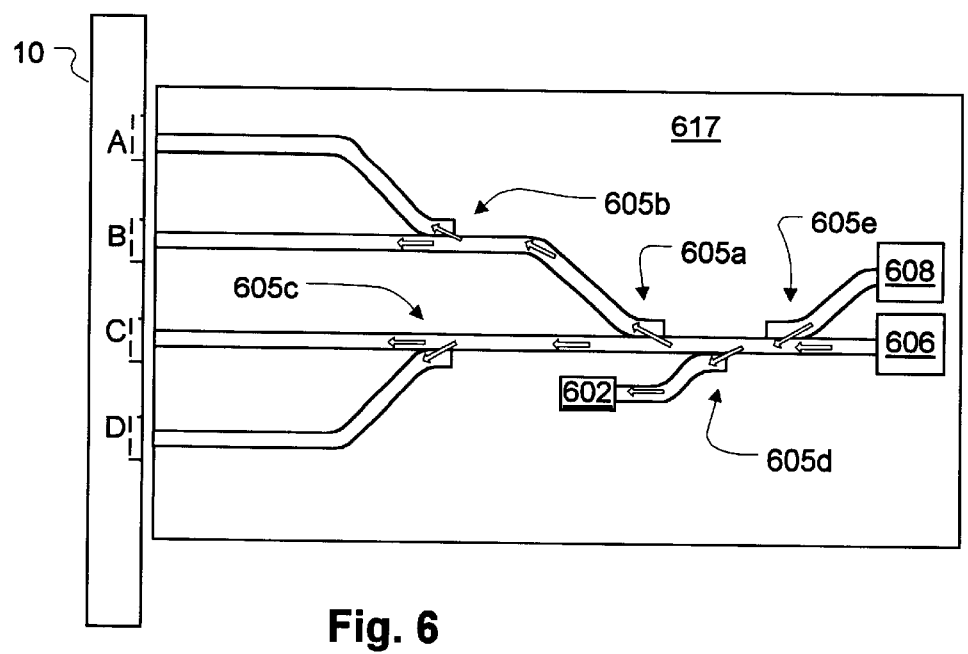
FIG. 6 shows an embodiment similar to that of FIG. 2 except that a backup laser is included with a crossover to the backup laser to supply the multiple channel light guide network.
Figure 7:
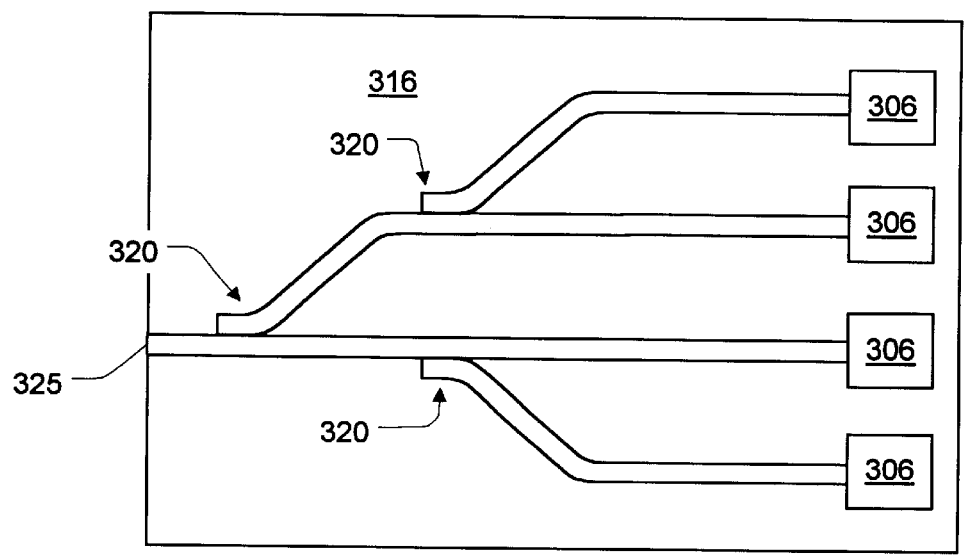
FIG. 7 is an illustration of a group of lasers formed in an optoelectronic chip interconnected by combiners to combine the energy of the lasers into one source.

Referring to FIG. 6, a chip 617 with an optical railtap 605e to allow crossover between the laser input channel, in case of a laser failure, allows a neighboring or backup laser 608 to be switched in to feed the outputs originally assigned to the source that failed 606. This crossover feature could also be used as shown in FIG. 7 to gang the output of several lasers to meet a scanning intensity requirement that exceeded the output of a single laser. The outputs of multiple lasers 306 can be combined for an application that requires an output intensity greater than a single laser can produce alone. In an optoelectronic chip 316, multiple optical rail taps 320 are used to combine the outputs of more than one laser 306. In this embodiment, four lasers combine to generate one combined output 325. This embodiment is particularly useful for use with laser devices such as vertical cavity surface emitting lasers (VCSELs) when used to write on materials requiring several milliwatts of power.

This method of combining the outputs of several lasers may impose special requirements on either the lasers of the railtap waveguides in order to avoid serious energy losses. One way of ensuring success is to use phase locking techniques so that the separate lasers produce light that is in phase.

Using the invention, laser light can be allocated among several output channels with very fast switching rates for optimum use of power for both reading and writing applications. Cost savings can also be achieved. Single laser outputs requiring more power than can be achieved with a single laser can be supported by using the output-combining feature described. In addition, laser output can be modulated without directly varying laser output power, thus allowing the laser to operate in a continuous wave (CW), long-lifetime, stable mode.

Figure 8:
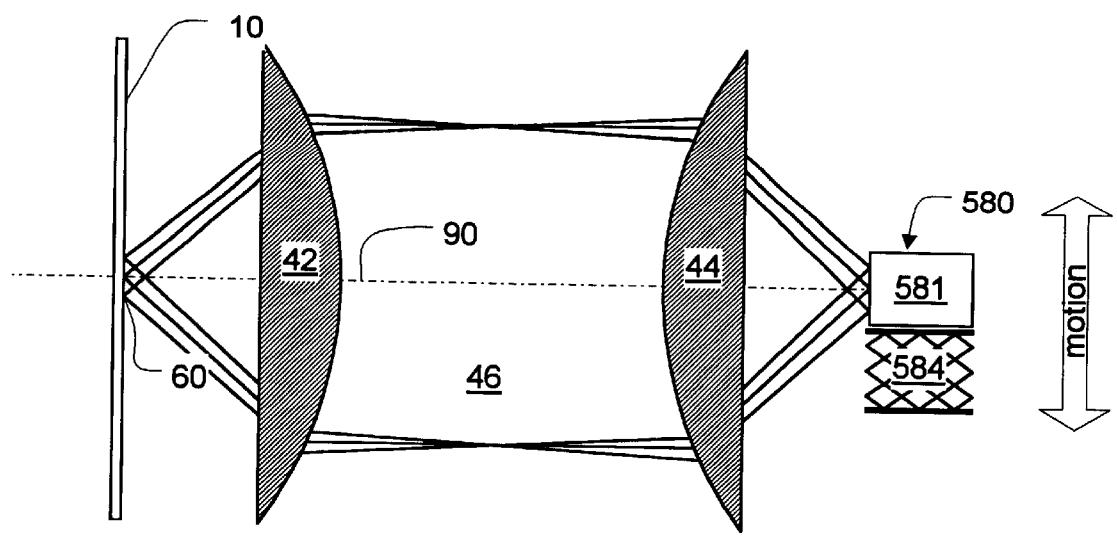
FIG. 8 is a ray trace diagram showing a multiple channel scanning head according an embodiment of the invention, where the imaging optics are fixed and the scanning head is oscillated by a MEMS motor to scan a region of a target surface.
Figure 9:
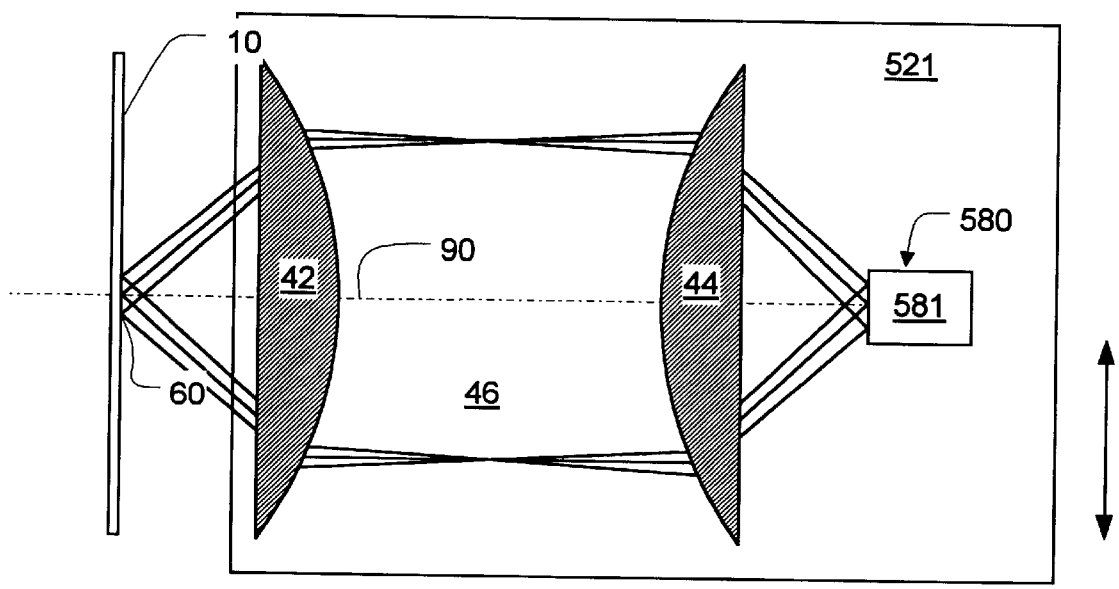
FIG. 9 is a ray trace diagram showing a multiple channel scanning head according an embodiment of the invention, where the imaging optics and scanning head are fixedly interconnected and oscillated as a unit by a MEMS motor to scan a region of a target surface.

Referring to FIG. 8, the small size of the embodiments discussed above lends itself to scanning using MEMS technology motors. In an embodiment of the invention, OE chip 581 according to any of the previous embodiments discussed, has multiple outputs, as described. Although the drawings only indicate ray traces for three beams, it is understood that the drawing is compatible with any number of outputs. OE chip 581 is oscillated by a motor 584 based on microelectromechanical systems (MEMS) technology. A scanning motion of multiple spots 60 can be obtained with this arrangement. The multiple focused spots 60 will scan over the surface 10 when the source array 580 is oscillated relative to the optical axis 90 of the lens system. In the embodiment of FIG. 9, the lens system 46 is held fixed and the OS chip 581 is oscillated. In a nominal lens system with 1:1 magnification, the spots move along the surface 10 the same distance as the stage 581.

Figure 10:
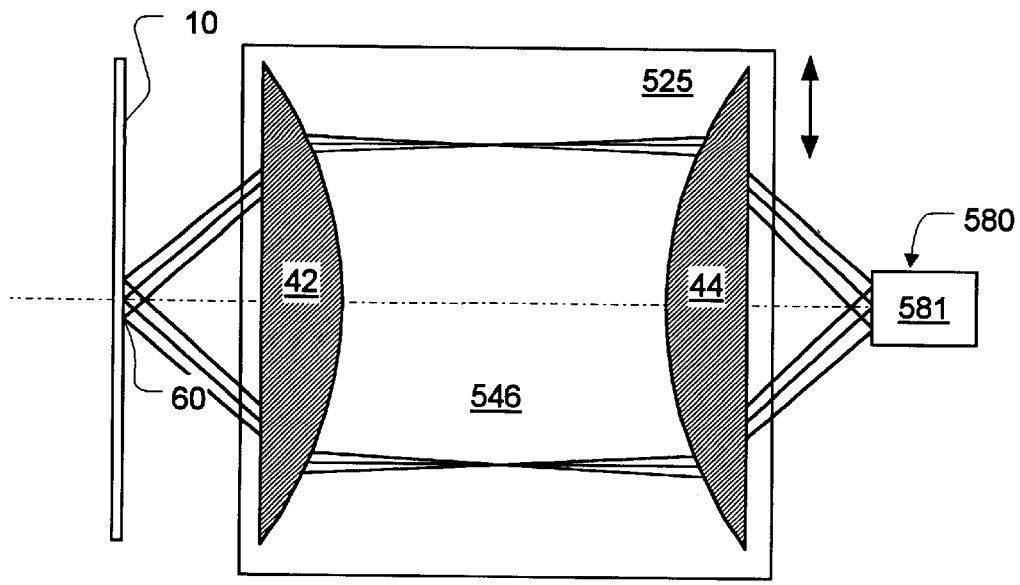
FIG. 10 is a ray trace diagram showing a multiple channel scanning head according an embodiment of the invention, where the imaging optics are oscillated as a unit by a MEMS motor to scan a region of a target surface.

Referring to FIG. 9, in an alternative embodiment, similar to that of FIG. 8, the focusing optics 46, as well as the light guide array 180, is oscillated. The focusing optics 46 and the source array 580 are supported on a single stage 121 which is oscillated by a motor (not shown). Referring to FIG. 10, in still another embodiment, lens system 46 is supported on stage 125 that is oscillated relative to both the scanned surface 10 and the source array 580.

Figure 11:
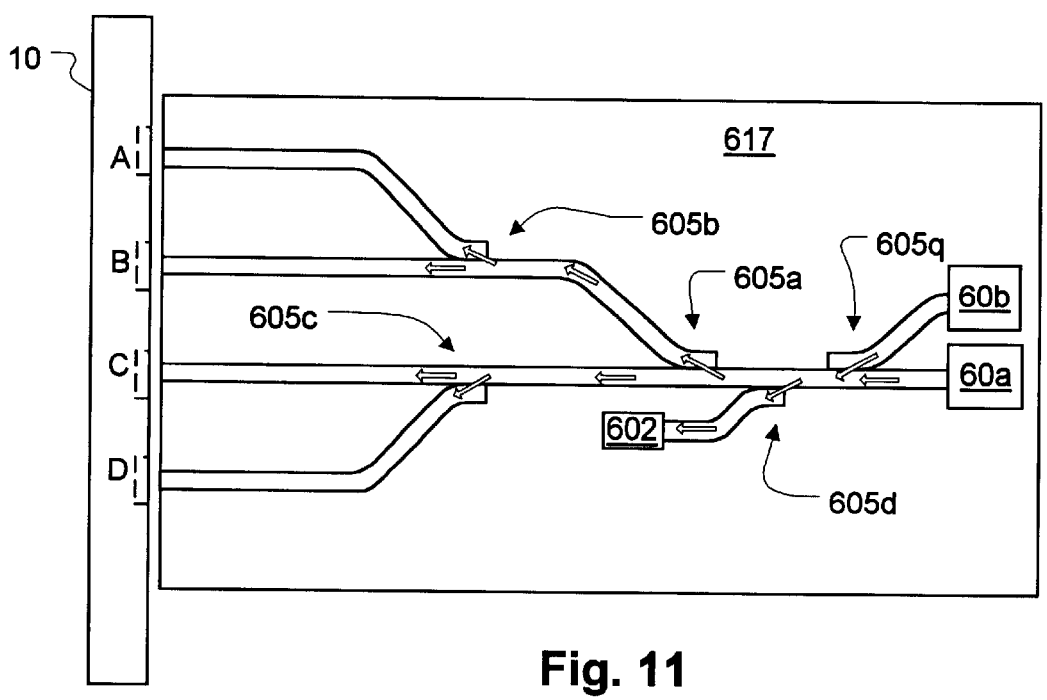
FIG. 11 shows an embodiment where light from two lasers is directed to a diverging series of light guides leading to multiple apertures, where the light fed into the diverging series of light guides can come selectively from one laser or from both of the lasers simultaneously.

Referring to FIG. 11, in an alternative embodiment of the invention, light from two lasers 60a and 60b is directed to a diverging series of light guides leading to multiple apertures, but the light fed into the input of the diverging series of light guides comes selectively from one of the lasers 60a and 60b, or from both lasers 60a and 60b, simultaneously, depending on whether a read operation is being performed (one laser at a time) or a write operation is being performed (both lasers simultaneously). Light is combined with coupler 605q. In this way, multiple channels can be written simultaneously using a larger number of lasers during the write operation.

Using the invention, laser light can be allocated among several output channels with very fast switching rates for optimum use of power for both reading and writing applications. Cost savings can also be achieved. Single laser outputs requiring more power than can be achieved with a single laser can be supported by using the output-combining feature described. In addition, laser output can be modulated without directly varying laser output power, thus allowing the laser to operate in a continuous wave (CW), long-lifetime, stable mode.

The electro-optical switch and the optical railtap (directional coupler) are both components that have been developed in other integrated optics material systems (e.g. lithium niobate). They have also been developed in polymer-based integrated optics.

The respective entireties of the following United States patent applications, filed concurrently herewith, are hereby incorporated by reference in the present application:

Scanning Device Using Fiber Optic Bimorph (Adam Thomas Drobot, Robert
Courtney White)
Multiple Parallel Source Scanning Device (Adam Thomas Drobot, Robert Courtney
White, Newel Convers Wyeth)
Multiple Channel Data Writing Device (Adam Thomas Drobot, Robert Courtney
White, Newel Convers Wyeth, Albert Myron Green)
Multiple Channel Scanning Device Using Optoelectronic Switching (Adam Thomas
Drobot, Robert Courtney White, Newel Convers Wyeth)
Method and Apparatus for Controlling the Focus of a Read/Write Head for an Optical
Scanner (Edward Alan Phillips, Newel Convers Wyeth)
Multiple Channel Scanning Device Using Oversampling and Image Processing to
Increase Throughput (Adam Thomas Drobot, Robert Courtney White, Newel
Convers Wyeth, Albert Myron Green, Edward Alan Phillips)
The respective entireties of the following references are hereby incorporated by reference in the present application:
M. Ataka, A. Omodaka, N. Takeshima, and H. Fujita, "Fabrication and Operation of
Polyimide Bimorph Actuators for a Ciliary Motion System", JMEMS, Volume 2, No. 4, page 146.
D. E. Brei and J. Blechschmidt, "Design and Static Modeling of a Semicircular
Polymeric Piezoelectric Microactuator", JMEMS, Volume 1, No. 3, page 106.
J. W. Judy, R. S. Muller, and H. H. Zappe, "Magnetic Microactuation of Polysilicon
Flexure Structures", JMEMS, Volume 4, No. 4, page 162.
T. S. Low and W. Guo, "Modeling of a Three-Layer Piezoelectric Bimorph Beam with Hysteresis", JMEMS.
Q. Meng, M. Mehregany, and R. L. Mullen, "Theoretical Modeling of
Microfabricated Beams with Elastically Restrained Supports", JMEMS, Volume 2, No. 3, page 128 et. seq.
K. Minami, S. Kawamura, and M. Esashi, "Fabrication of Distributed Electrostatic
Micro Actuator (DEMA)", JMEMS, Volume 2, No. 3, page 121 et. seq.
J. G. Smits, and A. Ballato, "Dynamic Admittance Matrix of Piezoelectric Cantilever
Bimorphs", JMEMS, Volume 3, No. 3, page 105 et. seq.
Yuji Uenishi, Hedeno Tanaka, and Hiroo Ukita, NTT Interdisciplinary Research
Laboratories (Tokyo, Japan), "AlGaAs/GaAs micromachining for monolithic integration of optical and mechanical components", Optical power driven cantilever resonator. Proceedings SPIE et. seq.

What is claimed is:

1. A multiple channel data reading/writing device for reading data from a medium and writing further data to a medium, comprising:
   a read/write head containing a source of light and an array of output apertures from which light is emitted to perform writing operations on said medium and to perform reading operations on said medium;
   a series of light guides, electro-optical switches, and a controller interconnected to guide, under control of said controller, light from said light source selectively to a first number of said output apertures at a first time coinciding with a writing operation and to guide said light from said light source to a second number of said output apertures at a second time coinciding with a reading operation.

2. A device as in claim 1, wherein said light source includes a light-dumping switch and a beam dump interconnected such that said light from said light source can be modulated by selectively dumping light into said beam dump and transmitting light into said series of light guides.

3. A device as in claim 1, wherein said first number is less than said second number.

4. A device as in claim 1, wherein said light source is a single laser embedded in an optoelectronic chip.

5. A device as in claim 1, wherein said light guides are formed photo lithographically in an optoelectronic chip.

6. A device as in claim 1, wherein said light source is a plurality of lasers linked together by switchable crossovers connected to said controller and said controller is programmed to switch a first of said plurality of lasers to transmit light into said series of light guides when a second of said plurality of lasers fails.

7. A device as in claim 6, wherein said light source includes a light-dumping switch and a beam dump interconnected such that said light from said light source can be modulated by selectively dumping light into said beam dump and transmitting light into said series of light guides.

8. A device as in claim 7, wherein said first number is less than said second number.

9. A device as in claim 1, wherein said light source is a plurality of lasers linked together by further light guides and couplers that direct light from each of said plurality of lasers into said series of light guides such that said light from said light source is, substantially, a sum of said light from each of said plurality of lasers.

10. A device as in claim 9, wherein said light source includes a light-dumping switch and a beam dump interconnected such that said light from said light source can be modulated by selectively dumping light into said beam dump and transmitting light into said series of light guides.

11. A device as in claim 10, wherein said first number is less than said second number.

12. A device as in claim 1, wherein said light source is a plurality of lasers linked together by switchable crossovers connected to said controller and said controller is programmed to switch a first of said plurality of lasers to transmit light into said series of light guides when a second of said plurality of lasers fails and said plurality of lasers are further linked together by further light guides and couplers that direct light from at least two of said plurality of lasers into said series of light guides such that said light from said light source is, substantially, a sum of said light from said at least two of said plurality of lasers.

13. A device as in claim 12, wherein said light source includes a light-dumping switch and a beam dump interconnected such that said light from said light source can be modulated by selectively dumping light into said beam dump and transmitting light into said series of light guides.

14. A device as in claim 12, wherein said first number is less than said second number.

15. A device as in claim 14, wherein said light source includes a light-dumping switch and a beam dump interconnected such that said light from said light source can be modulated by selectively dumping light into said beam dump and transmitting light into said series of light guides.

16. A device as in claim 1, further comprising:
   a frame connected to said read/write head;
   said medium being attachable to said frame such that said medium is movable relative to said read/write head, whereby said medium moves in a first direction relative to said read/write head;

an oscillating motor connected between said frame and said read/write head to oscillate said read/write head relative to said medium.

17. A device as in claim 16, wherein said medium is moved continuously in said first direction at a constant speed.

18. A device as in claim 16, wherein a direction of an oscillation of said read/write head has a component substantially perpendicular to said first direction.

19. A device as in claim 16, wherein said controller is programmed to convey substantially all of the light from light source sequentially toward each of said multiple output apertures.

20. A multiple channel data reading/writing device for reading data from a medium and writing further data to a medium, comprising:
    a read/write head containing a source of light and an array of output apertures from which light is emitted to perform writing operations on said medium and to perform reading operations on said medium;
    said read/write head having a series of light guides, electro-optical switches, and a controller interconnected to guide, under control of said controller, light from said light source selectively to a first number of said output apertures at a first time coinciding with a writing operation and to guide said light from said light source to a second number of said output apertures at a second time coinciding with a reading operation;
    a frame connected to said read/write head;
    said medium being attachable to said frame such that said piece of medium is movable relative to said read/write head, whereby said media moves in a first direction relative to said read/write head;
    an oscillating motor connected between said frame and said read/write head to oscillate said read/write head relative to said medium.

21. A device as in claim 20, wherein said light source includes a light-dumping switch and a beam dump interconnected such that said light from said light source can be modulated by selectively dumping light into said beam dump and transmitting light into said series of light guides.

22. A device as in claim 20, wherein said first number is less than said second number.

23. A device as in claim 20, wherein said light source is a single laser embedded in an optoelectronic chip.

24. A device as in claim 20, wherein said light guides are formed photo lithographically in an optoelectronic chip.

25. A device as in claim 20, wherein said light source is a plurality of lasers linked together by switchable crossovers connected to said controller and said controller is programmed to switch a first of said plurality of lasers to transmit light into said series of light guides when a second of said plurality of lasers fails.

26. A device as in claim 25, wherein said light source includes a light-dumping switch and a beam dump interconnected such that said light from said light source can be modulated by selectively dumping light into said beam dump and transmitting light into said series of light guides.

27. A device as in claim 26, wherein said first number is less than said second number.

28. A device as in claim 20, wherein said light source is a plurality of lasers linked together by further light guides and couplers that direct light from each of said plurality of lasers into said series of light guides such that said light from said light source is, substantially, a sum of said light from each of said plurality of lasers.

29. A device as in claim 28, wherein said light source includes a light-dumping switch and a beam dump interconnected such that said light from said light source can be modulated by selectively dumping light into said beam dump and transmitting light into said series of light guides.

30. A device as in claim 29, wherein said first number is less than said second number.

31. A device as in claim 20, wherein said light source is a plurality of lasers linked together by switchable crossovers connected to said controller and said controller is programmed to switch a first of said plurality of lasers to transmit light into said series of light guides when a second of said plurality of lasers fails and said plurality of lasers are further linked together by further light guides and couplers that direct light from at least two of said plurality of lasers into said series of light guides to combine said light from said at least two of said plurality of lasers.

32. A device as in claim 31, wherein said light source includes a light-dumping switch and a beam dump interconnected such that said light from said light source can be modulated by selectively dumping light into said beam dump and transmitting light into said series of light guides.

33. A device as in claim 31, wherein said first number is less than said second number.

34. A device as in claim 33, wherein said light source includes a light-dumping switch and a beam dump interconnected such that said light from said light source can be modulated by selectively dumping light into said beam dump and transmitting light into said series of light guides.

35. A method of reading and writing data from a medium using a light source, comprising the steps of:
    (1) directing light from said light source to a first plurality of light spots on a recordable medium during a writing operation to said medium;
    (2) directing light from said light source to a second plurality of light spots on said recordable medium during a reading operation of said medium; and
    (3) wherein the number of said first plurality of light spots is less than the number of said second plurality of light spots.

36. A method as in claim 35, wherein said step (1) includes directing light into a light guide leading to an output aperture and imaging light emitted from said output aperture onto said medium.

37. A method as in claim 35, wherein said step (2) includes directing light into at least one light guide leading to multiple output apertures and imaging light emitted from said output aperture onto said medium.

38. A method of reading and writing data from a medium using a light source, comprising the steps of:
    (1) directing light from said light source to a first number of light spots on a recordable medium during a writing operation to said medium;
    (2) directing light from said light source to a second number of light spots on said recordable medium during a reading operation of said medium; and
    (3) said first number being lower than said second number;
    wherein said step (1) includes directing light into a light guide leading to an output aperture and imaging light emitted from said output aperture onto said medium; and
    said step (2) includes directing light into at least one light guide leading to multiple output apertures and imaging light emitted from said output aperture onto said medium.

39. A method of reading and writing data from a medium using a light source, comprising the steps of:
  (1) directing light from said light source to a first number of light spots on a recordable medium during a writing operation to said medium;
  (2) directing light from said light source to a second number of light spots on said recordable medium during a reading operation of said medium; and
  (3) said first number being lower than said second number;
    wherein said step (1) includes directing light into a light guide leading to an output aperture and imaging light emitted from said output aperture onto said medium.

40. A method of reading and writing data from a medium using a light source, comprising the steps of:
  (1) directing light from said light source to a first number of light spots on a recordable medium during a writing operation to said medium; and
  (2) directing light from said light source to a second number of light spots on said recordable medium during a reading operation of said medium;
  (3) said first number being lower than said second number;
    wherein said step (2) includes directing light into at least one light guide leading to multiple output apertures and imaging light emitted from said output aperture onto said medium.

* * * * *